(12) United States Patent
Prasanna

(10) Patent No.: US 6,272,599 B1
(45) Date of Patent: Aug. 7, 2001

(54) CACHE STRUCTURE AND METHOD FOR IMPROVING WORST CASE EXECUTION TIME

(75) Inventor: G. N. Prasanna, Clinton, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/183,345

(22) Filed: Oct. 30, 1998

(51) Int. Cl.[7] ..................................................... G06F 12/00
(52) U.S. Cl. ........................ 711/138; 711/118; 711/139; 711/141; 711/145
(58) Field of Search .................................. 711/118, 123, 711/138, 139, 144, 145, 126

(56) References Cited

U.S. PATENT DOCUMENTS 4,075,686 * 2/1978 Calle et al. ........................... 711/138
5,247,639 * 9/1993 Yamahata ............................. 711/138
5,745,728 * 4/1998 Genduso et al. ..................... 711/126

OTHER PUBLICATIONS

Johnson et al. "Run–Time Cache Bypassing", Computers, IEEE Transactions on. vol: 48 Dec. 12, 1999, pp. 1338–1354.*

Chi et al. "Improving cache performance by selective cache bypass". System Sciences, 1989. vol. 1: Architecture Track, Proceedings of the 22nd Annual Hawaii International Conference on, pp. 277–285.*

* cited by examiner

Primary Examiner—Than Nguyen
(74) Attorney, Agent, or Firm—Jean-Marc Zimmerman

(57) ABSTRACT

An apparatus and method using selectively controlled cache/no-cache bits for improving the real-time performance of applications run on computers having cache memory by controlling the caching of different regions of address space thereby reducing thrashing or other forms of interference in the cache memory and improving the WCET performance of such applications.

17 Claims, 1 Drawing Sheet

DIRECT MAP
CALL PN AND
PN MOV R4,#0
CONFLICT IN CACHE
ENABLE/DISENABLE
CACHE

STATE-DEPENDENT CACHE CONTROL

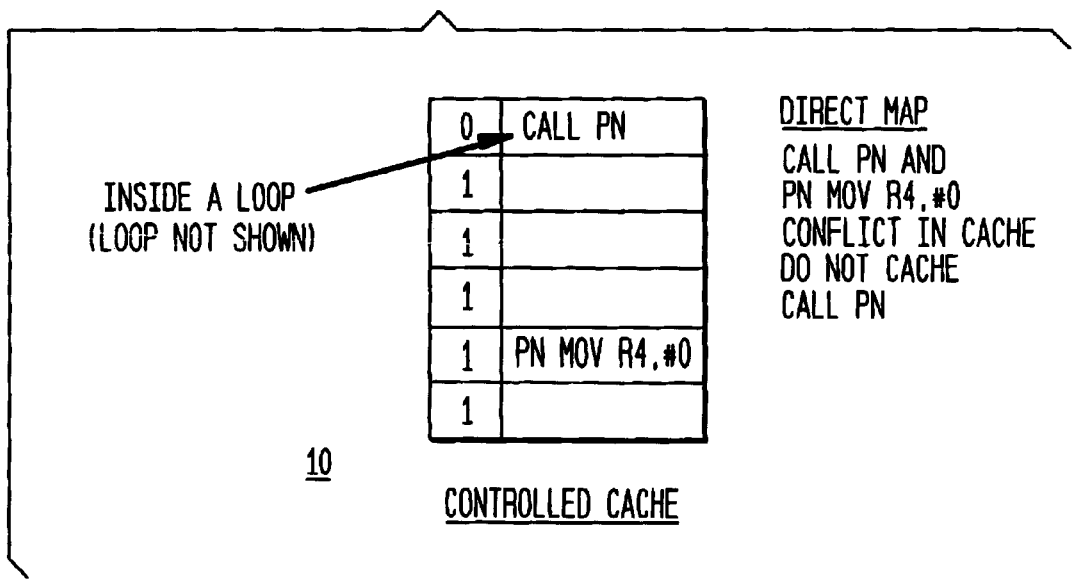
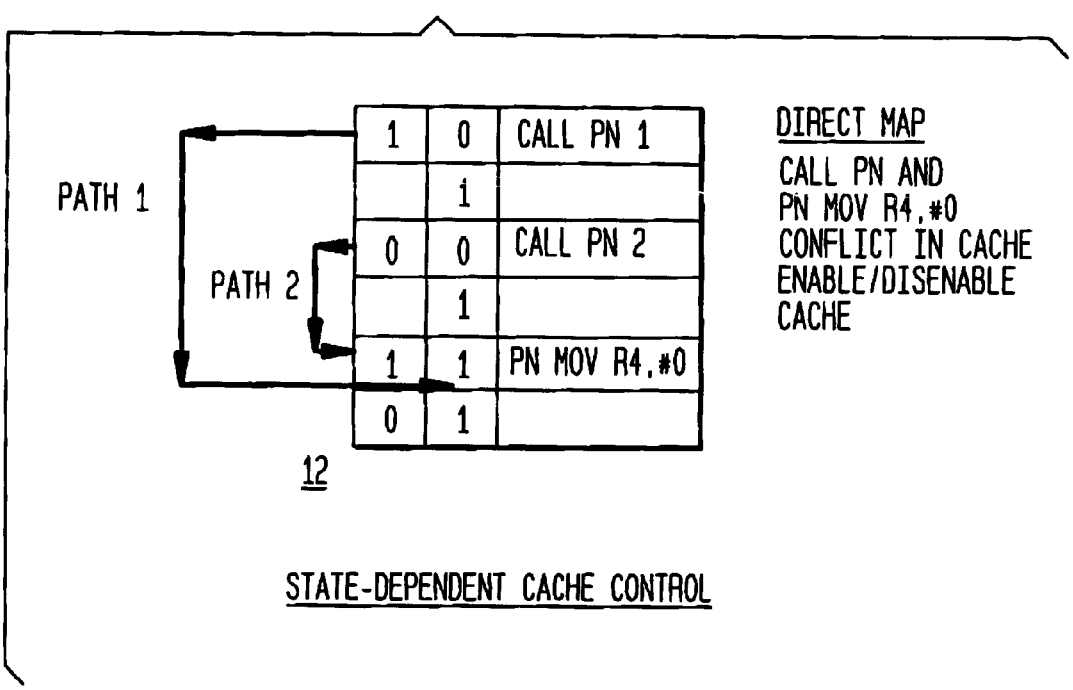

CACHE STRUCTURE AND METHOD FOR IMPROVING WORST CASE EXECUTION TIME

FIELD OF THE INVENTION

The present invention pertains to computers having cache-based architectures, and more particularly to an apparatus and a method for improving the worst-case execution time (WCET) of the central processing unit (CPU) of such computers.

BACKGROUND OF THE INVENTION

Cache memory is a small, fast buffer located between the CPU and the main system memory of a computer. Cache memory is well known in the art and is used in conventional computers to store recently accessed data and instructions so that such information can be quickly accessed again, thereby increasing the operating speed of the CPU. See, for example, Chi, C. H. and Diets, H., "Unified Management of Registers and Cache Using Liveness and Cache Bypass", *Proceedings of the ACM Conference on Programming Language Design and Implementation*, 344–355 (1989).

This increase in CPU throughput results from two factors. First, since the main system memory cycle time is typically slower than the CPU clocking rate, the CPU can access data and instructions stored in the cache memory more quickly than it can access such information from the main system memory of the computer. Second, accessing information from the cache memory rather than from the main system memory reduces the CPU's utilization of the available main system memory bandwidth, thereby allowing other devices on the system bus to use the main system memory without interfering with the operation of the CPU.

The improvement in computer system performance provided by cache memory is particularly important in high-performance systems running time-critical applications, as for example are used in the telecommunications field, where a quick response time and dependability are essential. However, the average execution time metric used in non-real time applications can not provide the stringent real-time performance guarantees required for such time-critical applications. By contrast, the WCET can be used to provide such stringent real-time performance guarantees. Accordingly, obtaining optimum WCET performance for such time-critical applications is important to ensuring that system constraints are met However, real-time applications run on computers having cache-based architectures suffer from a significant drawback due to the unpredictability of the behavior of such systems caused by thrashing and other forms of cache interference which render the cache useless. For example, thrashing can occur when a call function is mapped to the same cache line as its caller. This occurs because the code-linkers and code-generators do not to seek to minimize the WCET. Thrashing can also occur when a long sequence of instructions larger in size than the direct mapped cache in which such instructions are to be stored repeat in a loop such that instructions at the beginning of the loop conflict with instructions at the end of the loop. Loopunrolling can produce such long sequences of instructions.

It is therefore an object of the present invention to provide an apparatus and a method for overcoming the foregoing drawback by improving the real-time performance of applications run on computers having cache-based architectures by reducing the WCET performance of such applications to reduce thrashing in the cache.

SUMMARY OF THE INVENTION

An apparatus and method for improving the WCET performance of applications run on computers having cache-based architectures by setting cache/no-cache bits to selectively control the caching of different regions of address space thereby reducing thrashing in the cache memory and improving the real-time performance of such applications.

BRIEF DESCRIPTION OF THE DRAWINGS

FIG. 1 shows a first embodiment of the present invention in which a single cache/no-cache bit per block of instructions are used in conjunction with ILP software to reduce interference in a computer cache system.

FIG. 2 shows a second embodiment of the present invention in which two cache/no-cache bits per block of instructions are used in conjunction with ILP software to reduce interference in a computer cache system.

DETAILED DESCRIPTION OF THE INVENTION

The present invention remedies the problem of thrashing encountered in computers having conventional cache-based architectures by using an analytical tool, such as Cinderella software from Princeton University, to determine which setting of cache/no-cache bits for a particular application results in the greatest access to the cache memory and thus the lowest WCET. Cinderella uses an ILP algorithm to test the cache structure to determine the percentage of cache hits, i.e., successful attempts to access datum stored in the cache. This enables designers to select the cache/no-cache bit setting that will result in the lowest WCET and best real-time performance for the application. Alternatively, ILP software other than Cinderella can be used for this analytical purpose. The ILP software enables a designer to identify which lines to cache or not cache in order to avoid particular cache interference patterns.

The present invention is used to customize cache-based architectures to minimize the WCET of different applications by adding a cache/no-cache bit to each datum, thereby permitting selective caching of data and instructions. A datum is cached only if its cache/no-cache bit is 1, otherwise when the bit is 0 the datum is left in the main system memory. The control granularity, e.g. a bit per instruction or one or more bits per block of instructions, has to be appropriately chosen as it determines the resulting WCET and can thus improve performance.

FIG. 1 shows a first embodiment of the present invention in which a structure 10 having a single cache/no-cache bit per instruction feeds a direct mapped cache. Depending on address conflicts in the cache, the bits can be selectively turned on or off. The compiler analyzes the addressing patterns in the program to set the bits. Alternatively, other analytical tools can also be used to set the bits. The addressing pattern causing the worse case cache conflicts is identified, and some of the cached data causing this conflict is not cached thereby reducing the conflict.

The utility of the present invention is illustrated for direct-mapped caches by FIG. 1 where the object code is shown having a function called from within a loop. The address of the loop code and the function code are such that they conflict in the cache. Since the function is invoked in each iteration of the loop, the code for the loop and that for the function will alternately be brought into the cache, thereby thrashing each other out and rendering the cache useless.

However, by not caching either the loop code or the function code, the thrashing is reduced thereby providing at least 50% cache hits. Such selective caching is controlled by the compiler which monitors the cache conflict and in turn sets only one set of cache/no-cache bits to 1. The present invention can also be used to reduce thrashing which occurs when a sequence of instructions larger in size than the direct-mapped cache in which it is to be stored repeatedly run in a loop. In addition, since thrashing progressively worsens as associativity increases for sequential address streams in LRU (least recently used) caches, the present invention can further be used for N-way set associative caches to improve the performance of a computer where the size of the sequential address stream is greater than the total cache memory available.

FIG. 2 shows a second embodiment of the present invention in which a structure 12 uses a limited flow of control-flow information for caching. In this embodiment two cache/no-cache bits are used per instruction/block of instructions to feed a direct-mapped cache. The cache is controlled by one or the other cache/no-cache bits, based on the path taken by the program to arrive at the location. An additional selection bit associated with each incoming edge in the control-flow graph of the object code controls which cache/no-cache bit is used after the branch. If one of the cache/no-cache bits is always one or zero, it can be eliminated. This results in a cache structure in which, depending on the path, either all of the data is cacheable, or only some selected data is cached. This enables improved cache WCET performance over the single bit embodiment previously described and shown in FIG. 1. The cache control bit can be partially determined at run-time based on specific observed data access patterns. The cache/no-cache bit can also be used for other purposes including changing replacement policies.

The present invention can be implemented in both DSP (digital signal processing) architectures and RISC/CISC (reduced instruction set computer/complex instruction set computer) architectures used for signal processing applications, multimedia applications, and real-time applications having significant dynamic branching. In addition, the method of the present invention for selectively controlling cache lines can be added to most existing conventional caches with minor modifications.

Numerous modifications to and alternative embodiments of the present invention will be apparent to those skilled to the art in view of the foregoing description. Accordingly, this description is to be construed as illustrative only and is for the purpose of teaching those skilled in the art the best mode of carrying out the invention. Details of the structure may be varied substantially without departing from the spirit of the invention and the exclusive use of all modifications which come within the scope of the appended claims is reserved.

What is claimed is:

1. A cache structure for improving the worst case-execution time (WCET) of applications run on a computer having a cache memory, comprising:
    at least one cache/no-cache bit assigned to each block of data and instructions, whereby using an integer linear programming (ILP) algorithm the combination of cache/no-cache bit settings for each block of data and instructions which result in reduced thrashing and a desired WCET for the application can be determined so that these settings can be used thereafter to improve the real-time performance of the application, wherein the ILP algorithm identifies address patterns causing thrashing in the cache memory.

2. The cache structure according to claim 1, wherein the cache/no-cache bit is selectively turned on and off by the computer compiler.

3. The cache structure according to claim 1, wherein some of the cached data identified as causing the thrashing is not cached thereby reducing the thrashing.

4. The cache structure according to claim 1, wherein the cache/no-cache bit is turned on when set to 1.

5. The cache structure according to claim 1, wherein the cache/no-cache bit is turned off when set to 0.

6. The cache structure according to claim 1, wherein the structure enables thrashing which occurs in a direct-mapped cache when the address of a loop code and a function code conflict in the cache to be reduced by selectively not caching either the loop code or the function code.

7. The cache structure according to claim 1, wherein the structure reduces thrashing which occurs when a sequence of instructions larger in size than a direct-mapped cache in which the sequence of instructions are to be stored repeatedly run in a loop.

8. The cache structure according to claim 1, wherein the structure improves the WCET of an N-way set associative cache in which the size of a sequential address stream is greater than the total cache memory available.

9. A cache structure for improving the worst case-execution time (WCET) of applications run on a computer having a cache memory, comprising:
    at least one cache/no-cache bit assigned to each block of data and instructions, whereby using an ILP algorithm the combination of cache/no-cache bit settings for each block of data and instructions which result in reduced thrashing between two data blocks in the cache memory and thus a desired WCET for the application can be determined so that these settings can be used thereafter to improve the real-time performance of the application, wherein the ILP algorithm identifies an address pattern causing thrashing in the cache memory.

10. The cache structure according to claim 9, wherein the first one of the two data blocks comprises a first series of instructions of a function and the second one of the two data blocks comprises a second series of instructions of the function.

11. The cache structure according to claim 9, wherein the first one of the two data blocks comprises the address of a function and the second one of the two data blocks comprises the code of the function.

12. The cache structure according to claim 9, wherein the cache/no-cache bit is selectively turned on and off by the computer compiler.

13. A method for improving the WCET of applications run on a computer having a cache memory, comprising the steps of:
    assigning at least one cache/no-cache bit to each block of data and instructions;
    utilizing ILP to determine which combination of cache/no-cache bit settings for each block of data and instructions result in a desired WCET for the application, wherein the ILP identifies an address pattern causing thrashing in the cache memory; and
    using the cache/no-cache bit settings providing the desired result thereafter to improve the real-time performance of the application.

14. The method according to claim 13, wherein the cache/no-cache bit is selectively turned on and off by the computer compiler.

15. The method according to claim 13, wherein the cache/no-cache bit is turned on when set to 1.

16. The method according to claim 13, wherein the cache/no-cache bit is turned off when set to 0.

17. The method according to claim 13, wherein the WCET can be improved for an N-way set associative cache.

* * * * *